United States Patent

Sudau et al.

Patent Number: 5,911,628
Date of Patent: Jun. 15, 1999

[54] FLYWHEEL DEVICE WITH A SEAL FOR A GREASE CHAMBER

[75] Inventors: Jörg Sudau, Niederwerrn; Joachim Lindner, Hambach; Bernd Förster, Dittelbrunn; Bernhard Schierling, Kürnach, all of Germany

[73] Assignee: Fichtel & Sachs AG, Schweinfurt, Germany

[21] Appl. No.: 08/820,252

[22] Filed: Mar. 18, 1997

[30] Foreign Application Priority Data

Mar. 28, 1996 [DE] Germany ............... 196 12 352

[51] Int. Cl.⁶ ............................................. F16D 3/80
[52] U.S. Cl. .................. 464/24; 277/135; 464/66; 192/212
[58] Field of Search ................ 277/135; 192/212; 74/574; 464/24, 64, 66, 68

[56] References Cited

U.S. PATENT DOCUMENTS

| | | | |
|---|---|---|---|
| 2,678,835 | 5/1954 | Clark, Jr. | 277/135 |
| 4,103,902 | 8/1978 | Steiner et al. | 277/135 |
| 4,300,457 | 11/1981 | Moore | 277/135 |
| 4,363,777 | 12/1982 | Cornu et al. | 277/135 |
| 4,739,866 | 4/1988 | Reik et al. | 464/24 |
| 4,813,524 | 3/1989 | Reik | 464/66 |
| 4,947,700 | 8/1990 | Kern et al. | 464/24 |
| 5,239,750 | 8/1993 | Wright | 277/135 |
| 5,551,928 | 9/1996 | Sudau | 74/574 |

FOREIGN PATENT DOCUMENTS

| | | |
|---|---|---|
| 3630398 | 5/1987 | Germany . |
| 3721709 | 1/1988 | Germany . |
| 4444196 | 6/1995 | Germany . |
| 2 172 669 | 9/1986 | United Kingdom . |
| 2 234 574 | 2/1991 | United Kingdom . |
| 2 251 284 | 7/1992 | United Kingdom . |
| 2 269 440 | 2/1994 | United Kingdom . |

Primary Examiner—Eileen Dunn Lillis
Attorney, Agent, or Firm—Cohen, Pontani, Lieberman & Pavane

[57] ABSTRACT

A flywheel device has a first flywheel mass that is drivable and rotates around a rotational axis and a second flywheel mass that can be deflected relative to the first at least by a limited rotational angle. The second flywheel mass is drive-connected to the first flywheel mass by a torsional damping device. At least one flywheel mass has a grease chamber which at least partially accommodates the torsional damping device and is equipped with at least one seal against the escape of viscous medium. A first sealing part of the seal is connected to one of the flywheel masses and a second sealing part of the seal is connected to the other flywheel mass. The second sealing part is arranged in a radially offset manner relative to the first sealing part and has at least two fixed arms extending from an annual base in the direction of the first sealing part. Each of the arms is arranged at a predeterminable distance from the side of the first sealing part that faces it and forms, together with the other respective fixed arm and the base, an annular channel holding a highly-viscous medium. The first sealing part is submerged, at least in its region radially adjacent to the second sealing part, in the highly-viscous medium.

6 Claims, 1 Drawing Sheet

FLYWHEEL DEVICE WITH A SEAL FOR A GREASE CHAMBER

BACKGROUND OF THE INVENTION

1. Field of the Invention

The invention relates to a flywheel device and more particularly to a flywheel device having a seal.

2. Description of the Prior Art

German reference DE 36 30 398 A1 discloses a flywheel mass device with two flywheels that can be turned relative to one another. A center disk that acts as a moment transmitter is arranged between the flywheels. Torsional damping devices are accommodated on the center disk. The center disk runs in a grease chamber, which is encompassed by the first flywheel and a cover plate attached to the first flywheel, and is filled with a viscous medium. In the area of its radially inner end, one side of the cover plate rests under axial prestress on a seal, so that the viscous medium is prevented from escaping from the grease chamber.

Because the cover plate rests on the seal with axial prestress, the relative movement of the two flywheels regularly causes friction on the cover plate and the seal. As a result, the seal wears down rapidly. Once a certain level of wear occurs, the seal can no longer properly perform its function. If the seal is not changed in a timely manner, the escape of viscous medium from the grease chamber is unavoidable.

SUMMARY OF THE INVENTION

The invention is based on the object of designing the area of a flywheel device where viscous medium can preferably escape from a grease chamber due to a possible relative movement between the two balance weights in such a way that the area does not permit the penetration of any viscous medium even after long periods of operation and without maintenance.

Pursuant to this object, and others which will become apparent hereafter, one aspect of the present invention resides in a flywheel device comprised of a first flywheel mass drivable and rotatable about a rotational axis and a second flywheel mass which can be deflected relative to the first flywheel mass by at least a limited rotational angle. A torsional damping device is arranged to drivingly connect the second flywheel mass to the first flywheel mass. At least one of the flywheel masses is provided with a grease chamber in which the torsional dampening device is at least partially accommodated. Means are also provided for sealing against the leakage of viscous medium from the device. The sealing means includes a first sealing part connected to one of the flywheel masses and a second sealing part connected to the other of the flywheel masses. The second sealing part is arranged in a radially offset manner relative to the first sealing part and has an annular base and at least two fixed arms that extend from the annular base toward the first sealing part. Each of the arms is arranged at a predeterminable distance from a facing side of the first sealing part so that the fixed arms and the annular base form an annular channel for holding a highly-viscous medium. The first sealing part has a region radially adjacent to the second sealing part which is submerged in the highly viscous medium.

Designing the second sealing part in the form of a annular channel makes it possible for the first sealing part to engage into the second sealing part without touching the second sealing part either axially on the fixed arms or radially on the annual base, since a highly-viscous medium is present in the annular channel as a sealing agent. According to the invention, the annular channel accommodates the first sealing part, especially in the region radially adjacent to the second sealing part, so that the viscous medium (referred to simply as "grease" hereinafter, although oil could also be used) that moves from the grease chamber into the extension area of the first sealing part-for example, in the form of grease sprays-cannot leave the grease chamber. This is because the grease, regardless of whether it is sprayed directly into the annular channel or enters the annular channel as the result of centrifugal force after striking the first sealing part, encounters the highly-viscous medium in the annular channel. Since the grease is unable to displace the highly-viscous medium from the annular channel, it is prevented from escaping from the grease chamber. Grease that enters the annular channel thus has no choice other than to mix with the highly-viscous medium or to find its way back to the grease chamber.

As a result, the present invention provides a seal for the grease chamber that, on the one hand, is free from friction and thus from wear, but, on the other hand, permits complete sealing of the grease chamber. At the same time, depending on the viscosity of the medium located in the annular channel, this seal influences the dynamic behavior of the flywheel device. Speed-proportional damping, which is dependent on the viscosity of the medium, is created as the result of the adhesive properties of the medium and can be modified by the geometry of the annular channel of the second sealing part. For example, the strength of the displacement effect caused by the first sealing part on the highly-viscous medium in the second sealing part exercises an effect, so that the relative widths of the two sealing parts can be of considerable importance. Preferably, optimum damping is attained when the first sealing part is designed in a substantially disk-shaped manner. The first sealing part then also serves as a means for catching grease sprays coming from the grease chamber. A further advantage of designing the first sealing part in the form of a disk is that the sealing part can then be optimally clamped between two components of the balance weight that accommodates it.

According to the invention, the fixed arms of the second sealing part extend different distances in the radial direction. The reason for this is as follows: Depending on the speed, and thus on the speed differential between the two sealing parts, as well as on the amount of grease in the grease chamber and the amount of highly-viscous medium in the annual channel, the level of the highly-viscous medium in the annular channel is established based on the aforementioned conditions. If, in the radially inward extension direction of the fixed arms, the inner radius of the arm arranged in the grease space is fallen below, then the grease coming from the grease space and reaching the annular channel will be transported back to the grease space. This also explains why the fixed arm in the grease chamber should be smaller than that outside of the grease area.

Manufacturing the seal in one piece permits economical and simple production. The two sealing parts can then be separated simply by the application of a slight overload.

A fact of essential importance for the functional behavior of the seal is that the medium in the annular channel substantially maintains the viscosity that prevails at room temperature, even at the maximum temperature that occurs. This makes it possible to prevent the medium from dripping due to gravity when the torsional vibration damper is shut down, which would have a negative effect on the sealing function.

According to another embodiment of the invention, the distance of the respective fixed arms of the second sealing part to the first sealing part is always greater than the maximum tolerance occurring in the relative arrangement of the two flywheel masses. This is of essential importance because, given unfavorable tolerance in the flywheel masses, the two sealing parts could approach one another so forcefully as to come into frictional contact with one another. This would nullify the essential advantages of the seal according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
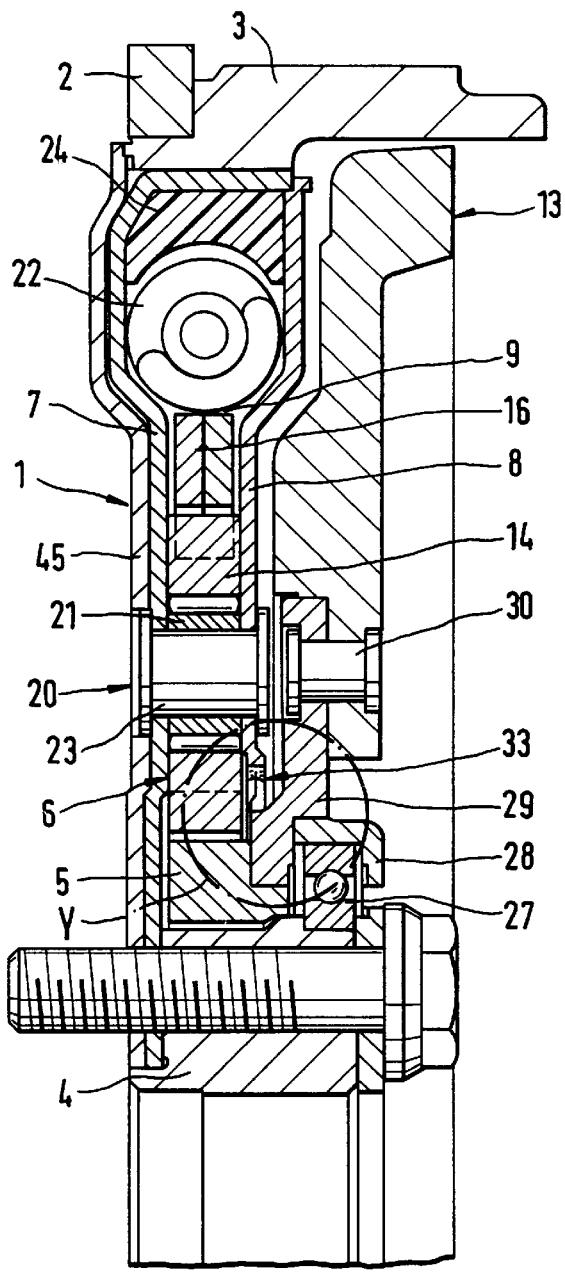
FIG. 1 A flywheel mass device with two flywheels rotatable relative to one another, one of which has a grease chamber with which a seal is associated.

FIG. 1 shows a flywheel device, which on its left side has a drive-side flywheel mass 1 with a primary plate 45 that runs substantially radially outward. The primary plate 45 is equipped in the circumferential area with an axial ring 3 with a toothed rim 2 for a starting pinion (not shown). The primary plate 45 is attached to a hub 4, which can be located on a crankshaft (not shown) of an internal combustion engine and carries a bearing 27. Clamped axially between the primary plate 45 and the hub 4 is a first planetary carrier 7, which is securely connected in the radially outer area to a second planetary carrier 8 to form a grease chamber 9. The grease chamber 9 accommodates planetary gears 14, which are engaged via teeth with a sun gear 5 and a hollow gear 16, which itself is connected via its teeth to the planetary gears 14. The aforementioned planetary carriers 7, 8 are equipped with a plurality of bearings 20—for example, needle bearings—arranged circumferentially at equal diameters. One of the planetary gears 14 is respectfully located on each bearing 20. The gears 14 are held at a fixed distance relative to one another in the axial direction by sleeves 21, and are securely tightened by rivets 23, which are located in the sleeves 21, in the direction of the two ends of each respective sleeve 21 in question.

On the aforementioned bearing 27, the output-side flywheel mass 13 is accommodated by means of a ring 28 that is attached to a disk-like member 29. The output-side flywheel mass 13 is securely connected to the disk-like member 29 by rivets 30. The sun gear 5 is attached to the other side of the disk-like member 29.

Figure 2:
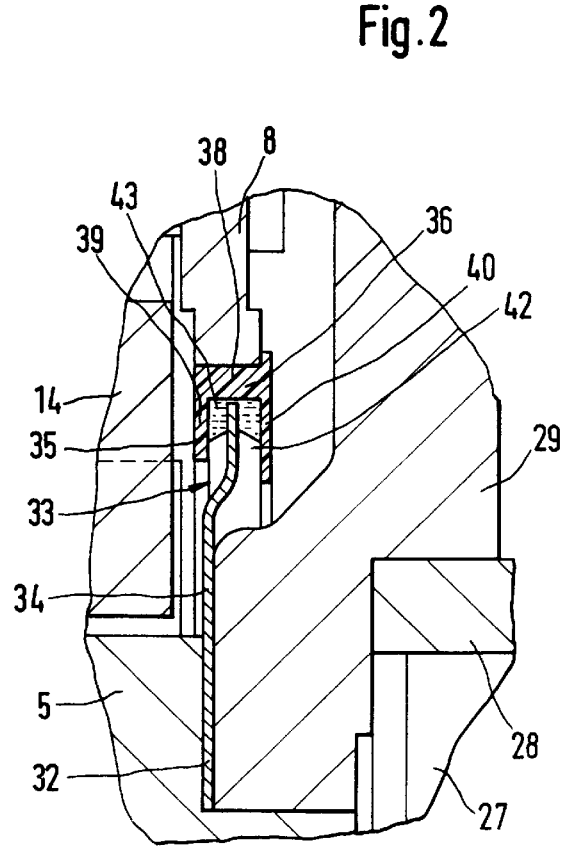
FIG. 2 An enlarged detail showing the seal of FIG. 1.

As FIG. 2 more clearly shows, a first sealing part 32 of a seal 33 is clamped axially between the disk-like member 29 and the sun gear 5. The first sealing part 32 is embodied in the form of a disk 34, and extends with its radially outer area 35 into an extension area of a second sealing part 36 of the seal 33. The second sealing part 36 is accommodated on the radially inner end of the planetary carrier 8 facing the output-side flywheel mass 13. The second sealing part 36 has an annular base 38, from which respective fixed arms 39, 40 extend, on both sides of the second sealing part 36, radially inwardly in the direction of the first sealing part 32. The annular base 38, together with the fixed arms 39 and 40, forms an annular channel 42 for a highly-viscous medium 43, which fills the annular channel 42 to an extent that the radially outer area 35 of the first sealing part 32 is submerged into this medium. The viscosity selected for the medium should be so great that even in the case of maximum heating of the flywheel device and when the latter is shut down, the medium is unable to drip out of the annular channel 42 due to gravity. In the axial direction, the distance of the respective fixed arms 39, 40 to the associated side of the first sealing part 32 must be established so that even in the case of an unfavorable combination of tolerances in the axial direction, the first sealing part 32 cannot come to rest on one of the fixed arms 39, 40. Relative to the radial direction, the same applies between the first sealing part 32 and the annular base 38 of the annular channel 42.

The function of a flywheel device, as shown in FIG. 1, is described at length in patent literature, for example, in DE-44 44 196 A1. For this reason, only the function of the seal 33 according to the invention will be discussed in greater detail below.

If grease, which is located in the grease chamber 9, drips or is sprayed radially inward into the area of the planetary gear 14 or the sun gear 5, the following happens: Either the grease strikes the side of the first sealing part 32 facing the grease chamber and is transported radially outward in the direction of the second sealing part 36 due to centrifugal force when the flywheel device is rotated, or else the grease is sprayed directly into the extension area of the latter. There, the grease encounters the highly-viscous medium 43 with which the annular channel 42 is filled. The highly-viscous medium 43 prevents the grease from passing outwardly out of the grease chamber 9, because the grease is unable to displace the highly-viscous medium 43 from the annular channel 42. The grease thus must either mix with the highly-viscous medium 43 or else, when the flywheel device is shut down, in respect to the great located above the rotational axis, must run radially inward due to gravity. Then, when operation resumes, the grease again moves radially outward, due to centrifugal force, toward its actual destination, i.e., to the spring device 22. The spring device 22 has individual springs that extend in the circumferential direction and rest (in a manner not shown) on the hollow gear 16 at one end and, in contrast, on supports on the planetary carriers 7 and 8 at the other end. In the radially outward direction, the spring device 22 is guided by glide shoes 24.

The invention is not limited by the embodiments described above which are presented as examples only but can be modified in various ways within the scope of protection defined by the appended patent claims.

We claim:

1. A flywheel device, comprising: a first flywheel mass drivable and rotatable around a rotational axis; a second flywheel mass which can be deflected relative to the first flywheel mass by at least a limited rotational angle; a torsional damping device arranged to drivingly connect the second flywheel mass to the first flywheel mass, at least one of the flywheel masses having a grease chamber, the torsional damping device being at least partially accommodated in the grease chamber; and, means for sealing against leakage of viscous medium, the sealing means including a first sealing part connected to one of the flywheel masses and a second sealing part connected to the other of the flywheel masses, the second sealing part being arranged in a radially offset manner relative to the first sealing part and having an annular base and at least two fixed arms that extend from the annular base toward the first sealing part, each of the arms being arranged at a predetermined distance from a facing side of the first sealing part, the fixed arms and the annular base forming an annular channel for holding a highly-viscous medium, the first sealing part having a region radially adjacent to the second sealing part and submerged in the highly-viscous medium, one of the fixed arms being provided on a side of the second sealing part facing away from the grease chamber so as to extend, relative to the other fixed arm, radially further toward the first sealing part.

2. A flywheel device as defined in claim 1, wherein the first sealing part, which is submerged into the highly-viscous medium, is substantially disk-shaped.

3. A flywheel device as defined in claim 1, wherein the second flywheel mass includes a sun gear and a disk-like member, the first sealing part being clamped between the sun gear and the disk-like member.

4. A flywheel device as defined in claim 1, wherein the first sealing part and the second sealing part are together formed as a single separable component.

5. A flywheel device as defined in claim 1, wherein the distance of the annular base and the fixed arms of the second sealing part from the first sealing part is always greater than a maximum tolerance that occurs in the arrangement of the two flywheel masses relative to one another.

6. A flywheel device, comprising:
a first flywheel mass drivable and rotatable around a rotational axis; a second flywheel mass which can be deflected relative to the first flywheel mass by at least a limited rotational angle; a torsional damping device arranged to drivingly connect the second flywheel mass to the first flywheel mass, at least one of the flywheel masses having a grease chamber, the torsional damping device being at least partially accommodated in the grease chamber; and, means for sealing against leakage of viscous medium, the sealing means including a first sealing part connected to one of the flywheel masses and a second sealing part connected to the other of the flywheel masses, the second sealing part being arranged in a radially offset manner relative to the first sealing part and having an annular base and at least two fixed arms that extend from the annular base toward the first sealing part, each of the arms being arranged at a predetermined distance from a facing side of the first sealing part, the fixed arms and the annular base forming an annular channel for holding a highly-viscous medium, the first sealing part having a region radially adjacent to the second sealing part and submerged in the highly-viscous medium, the highly viscous medium in the annular channel having a viscosity that is substantially constant even at a maximum operating temperature so that the highly viscous medium does not drip out of the annular channel due to gravity when the torsional damping device is shut down.

* * * * *